United States Patent
Mochizuki et al.

(10) Patent No.: US 10,527,135 B2
(45) Date of Patent: Jan. 7, 2020

(54) HYDRAULIC AUTO-TENSIONER

(71) Applicant: NTN CORPORATION, Osaka (JP)

(72) Inventors: Yuta Mochizuki, Shizuoka (JP); Satoshi Kitano, Shizuoka (JP)

(73) Assignee: NTN CORPORATION, Osaka (JP)

( * ) Notice: Subject to any disclaimer, the term of this patent is extended or adjusted under 35 U.S.C. 154(b) by 171 days.

(21) Appl. No.: 15/546,451

(22) PCT Filed: Jan. 29, 2016

(86) PCT No.: PCT/JP2016/052605
§ 371 (c)(1),
(2) Date: Jul. 26, 2017

(87) PCT Pub. No.: WO2016/129411
PCT Pub. Date: Aug. 18, 2016

(65) Prior Publication Data
US 2018/0017142 A1    Jan. 18, 2018

(30) Foreign Application Priority Data
Feb. 9, 2015    (JP) ................ 2015-022950

(51) Int. Cl.
*F16H 7/08* (2006.01)
*F16J 15/3204* (2016.01)
(Continued)

(52) U.S. Cl.
CPC ....... *F16H 7/0836* (2013.01); *F15B 15/1461* (2013.01); *F16F 1/00* (2013.01);
(Continued)

(58) Field of Classification Search
CPC ..... F16H 2007/0806; F16H 2007/0859; F16H 7/0836; F16H 2007/0891; F16H 2007/0812
(Continued)

(56) References Cited

U.S. PATENT DOCUMENTS 4,036,335 A * 7/1977 Thompson ............. B60G 17/08
188/282.9
4,752,280 A * 6/1988 Brandenstein ........ F16H 7/1218
474/138

(Continued)

FOREIGN PATENT DOCUMENTS

EP    2 381 131    10/2011
JP    8-303537    11/1996
(Continued)

OTHER PUBLICATIONS

International Preliminary Report on Patentability dated Aug. 15, 2017 in International (PCT) Application No. PCT/JP2016/052605.
(Continued)

*Primary Examiner* — Henry Y Liu
(74) *Attorney, Agent, or Firm* — Wenderoth, Lind & Ponack, L.L.P.

(57) ABSTRACT

A hydraulic auto-tensioner includes a rod inserted in a cylinder having a bottom and containing hydraulic oil, and a hydraulic damper in the cylinder for damping the push-in force that tends to push the cylinder and the rod in the direction in which the rod is pushed into the cylinder. An oil seal including a dust lip on the inner periphery thereof seals an open end of the cylinder. A rose-shaped snap ring is formed integral with the oil seal.

2 Claims, 4 Drawing Sheets

(51) Int. Cl.
*F16J 15/3252* (2016.01)
*F16J 15/3276* (2016.01)
*F16F 1/00* (2006.01)
*F15B 15/14* (2006.01)
*F16F 9/36* (2006.01)
*F16J 15/3208* (2016.01)

(52) U.S. Cl.
CPC .............. *F16F 9/36* (2013.01); *F16H 7/08* (2013.01); *F16H 7/0848* (2013.01); *F16J 15/3204* (2013.01); *F16J 15/3252* (2013.01); *F16J 15/3276* (2013.01); *F16H 2007/0812* (2013.01); *F16H 2007/0859* (2013.01); *F16J 15/3208* (2013.01)

(58) Field of Classification Search
USPC ........................................................ 474/110
See application file for complete search history.

(56) References Cited

U.S. PATENT DOCUMENTS

| | | | | |
|---|---|---|---|---|
| 4,790,796 | A * | 12/1988 | Okabe | F16H 7/08 474/110 |
| 4,798,563 | A * | 1/1989 | Okabe | F16H 7/1236 474/110 |
| 4,925,436 | A * | 5/1990 | Hayashi | F16H 7/1263 188/313 |
| 4,950,209 | A * | 8/1990 | Kawashima | F16H 7/1236 474/110 |
| 4,976,660 | A * | 12/1990 | Breindl | F16H 7/1236 474/110 |
| 4,997,410 | A * | 3/1991 | Polster | F16H 7/0836 474/110 |
| 5,026,330 | A * | 6/1991 | Zermati | F16H 7/1236 474/110 |
| 5,383,813 | A * | 1/1995 | Odai | F16H 7/129 474/110 |
| 5,482,262 | A * | 1/1996 | Hayakawa | F16H 7/1236 267/226 |
| 5,785,619 | A * | 7/1998 | Nakakubo | F16H 7/08 474/109 |
| 5,993,341 | A * | 11/1999 | Anderson | F16H 7/08 137/543.17 |
| 6,036,612 | A * | 3/2000 | Katogi | F16H 7/0848 474/101 |
| 6,106,424 | A * | 8/2000 | Kratz | F16H 7/0836 474/110 |
| 6,234,929 | B1 * | 5/2001 | Rasche | F16H 7/0836 474/110 |
| 6,413,179 | B1 * | 7/2002 | Koike | F01L 1/02 474/109 |
| 6,666,784 | B1 * | 12/2003 | Iwamoto | F01L 1/024 137/554 |
| 7,241,239 | B2 * | 7/2007 | Tanaka | F16H 7/0836 474/101 |
| 7,775,922 | B2 * | 8/2010 | Tanaka | F16C 33/74 474/110 |
| 8,323,137 | B2 * | 12/2012 | Hartmann | F16H 7/0836 474/110 |
| 9,046,176 | B2 * | 6/2015 | Sato | F16J 1/00 |
| 9,169,728 | B2 * | 10/2015 | Wallace | F01D 21/04 |
| 9,423,009 | B2 * | 8/2016 | Satomura | F16H 7/1236 |
| 2003/0171179 | A1 * | 9/2003 | Okuda | F16H 7/129 474/110 |
| 2005/0064969 | A1 * | 3/2005 | Tomita | F16H 7/0836 474/101 |
| 2005/0130777 | A1 * | 6/2005 | Grunau | F16H 7/0848 474/110 |
| 2012/0090457 | A1 * | 4/2012 | Kowalski | F16H 7/0836 91/468 |
| 2014/0057748 | A1 * | 2/2014 | Satomura | F16H 7/1236 474/110 |
| 2015/0252878 | A1 * | 9/2015 | Kitano | F16H 7/0836 474/101 |

FOREIGN PATENT DOCUMENTS

| | | |
|---|---|---|
| JP | 2003-166607 | 6/2003 |
| JP | 2004-251416 | 9/2004 |
| JP | 2005-98321 | 4/2005 |
| JP | 2007-303646 | 11/2007 |
| JP | 2009-275757 | 11/2009 |
| JP | 2011-58589 | 3/2011 |
| JP | 2011-226564 | 11/2011 |

OTHER PUBLICATIONS

International Search Report dated Apr. 5, 2016 in International (PCT) Application No. PCT/JP2016/052605.

* cited by examiner

HYDRAULIC AUTO-TENSIONER

TECHNICAL FIELD

This invention relates to a hydraulic auto-tensioner used to adjust the tension of an engine accessory driving belt for driving engine accessories such as an alternator, a water pump, and the compressor of an air-conditioner, or a timing belt for driving camshafts.

BACKGROUND ART

JP Patent Publication 2009-275757A discloses a known hydraulic auto-tensioner of this general type. This auto-tensioner includes a cylinder containing hydraulic oil, a rod inserted in the cylinder, and a return spring mounted between a spring seat at the end of the rod and a flange on the outer periphery of the closed end of the cylinder, and biasing the cylinder and the rod in the direction in which the rod protrudes from the cylinder.

This hydraulic auto-tensioner further includes a hydraulic damper mounted inside of the cylinder, and which is configured to damp the push-in force that tends to push the cylinder and the rod in the direction in which the rod is pushed into the cylinder.

To keep the tension of a belt of the above-described type constant with this hydraulic auto-tensioner, one of a mounting piece on the spring seat at the end of the rod, and a mounting piece on the closed end of the cylinder is attached to an engine block. The other mounting piece is coupled to a pulley arm pivotally attached to the engine block such that a tension pulley rotatably supported on the pulley arm is pressed against the belt under the biasing force of the return spring.

FIG. 6 shows the above-described conventional hydraulic auto-tensioner. As shown, an oil seal 61 including dust lip 62 on the inner periphery thereof is mounted in the open end portion of the cylinder 60 to seal the opening of the cylinder 60, thereby preventing leakage of hydraulic oil in the cylinder 60. A snap ring 63 is used to prevent the oil seal 61, which is press-fitted into the cylinder, from coming out of the cylinder 60.

In FIG. 6, the snap ring 63 is a rose-shaped snap ring including an annular plate portion 63a, and a plurality of engaging pieces 63b extending obliquely in the same direction from the outer periphery of the annular plate portion 63a. This rose-shaped snap ring 63 can be easily mounted in position by arranging the snap ring 63 around the rod 64 together with the oil seal 61, and inserting the rod 64 into the cylinder 60 so that the spring seat 65 at the end of the rod 64, shown by chain line in FIG. 6, is axially pushed into the cylinder 60, but has the following problems.

In particular, if there is a large gap between the rod 64 and the center hole 63c of the rose-shaped snap ring 63, when mounting the rose-shaped snap ring 63, such a gap could destabilize the position of the rose-shaped snap ring 63, making it difficult to mount the rose-shaped snap ring 63 properly. Thus, the rod 64 and the rose-shaped snap ring 63 are designed such that only a small gap forms therebetween. However, such a small gap causes another problem that when the cylinder 60 and the rod 64 slide or incline relative to each other while the tension of the belt is being adjusted by the hydraulic auto-tensioner, the dust lip 62 of the oil seal 61 could be pulled into the center hole 63c of the rose-shaped snap ring 63, and torn off.

An object of the present invention is to provide a hydraulic auto-tensioner which is designed such that the dust lip of the oil seal will never be torn off.

SUMMARY OF THE INVENTION

In order to achieve the above-noted object, according to a first aspect of the present invention, a hydraulic auto-tensioner comprises:
a cylinder having a bottom and containing hydraulic oil;
a rod inserted in the cylinder, and having an end located outside of the cylinder;
a return spring biasing the rod and the cylinder in the direction in which the rod protrudes from the cylinder;
a hydraulic damper mounted inside of the cylinder, and configured to damp a push-in force that tends to push the rod and the cylinder in the direction in which the rod is pushed into the cylinder;
an oil seal including a dust lip at an end of the inner periphery of the oil seal, and mounted in a portion of the cylinder including an open end of the cylinder such that the dust lip is in elastic contact with the radially outer surface of the rod; and
a rose-shaped snap ring including an annular plate portion, and a plurality of engaging pieces on the outer periphery of the annular plate portion, and mounted between the oil seal and the open end of the cylinder to prevent the oil seal from coming out of the cylinder,
wherein the rose-shaped snap ring is formed integral with the oil seal such that the annular plate portion is located below the dust lip.

Since, as described above, the rose-shaped snap ring is formed integral with the oil seal such that the annular plate portion is located below the dust lip, the dust lip will never be torn off by being pulled into a gap between the radially inner surface of the annular plate portion and the radially outer surface of the rod, when the rod and the cylinder move axially or incline relative to each other during use of the hydraulic auto-tensioner.

In order to achieve the above object, according to a second aspect of the invention, instead of, as in the first aspect of the invention, forming the rose-shaped snap ring integral with the oil seal, after press-fitting the oil seal into the open end portion of the cylinder, the rose-shaped snap ring is press-fitted from over the oil seal, with an annular spacer disposed between the opposed portions of the rose-shaped snap ring and the oil seal, to prevent separation of the oil seal.

According to a third aspect of the invention, instead of, as in the first aspect of the invention, forming the rose-shaped snap ring integral with the oil seal, the dust lip is shaped such that the distal end of the dust lip is located at a lower level than the top end surface of the oil seal, and after press-fitting the oil seal into the open end portion of the cylinder, the rose-shaped snap ring is press-fitted from over the oil seal to prevent separation of the oil seal.

In either of the second and third aspects of the invention, an axial clearance forms between the distal end of the dust lip and the rose-shaped snap ring. This clearance prevents the dust lip from being pulled into the center hole of the rose-shaped snap ring when the rod and the cylinder axially move or incline relative to each other during use of the hydraulic auto-tensioner.

In any of the first to third aspects of the invention, the oil seal may be made from either a rubber or a resin. In either case, the oil seal is reinforced with a meal core inserted in the oil seal.

Advantages of the Invention

In any of the first to third aspects of the invention, it is possible to prevent the dust lip from being torn off by being pulled into a gap between the radially outer surface of the rod and the radially inner surface of the annular plate portion of the rose-shaped snap ring, when the rod and the cylinder axially move or incline relative to each other.

BRIEF DESCRIPTION OF THE INVENTION

DETAILED DESCRIPTION OF THE INVENTION

Figure 1:
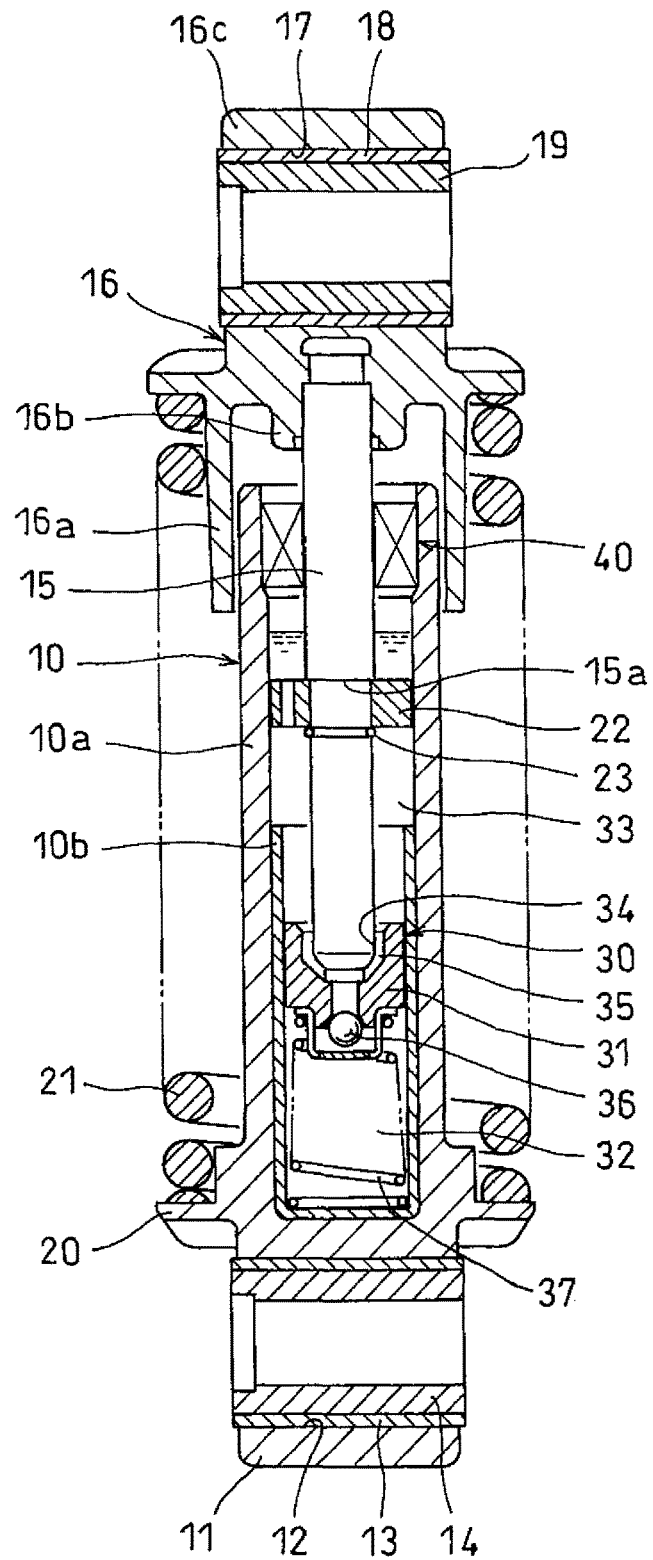
FIG. 1 is a vertical sectional view of a hydraulic auto-tensioner embodying the present invention.

Now referring to the drawings, a hydraulic auto-tensioner embodying the present invention is described. As shown in FIG. 1, the hydraulic auto-tensioner includes a cylinder 10 comprising an outer tube 10a and an inner tube 10b fitted in the outer tube 10a and having a bottom. The outer tube 10a is made from aluminum or aluminum alloy, and formed by die casting. The inner tube 10b is made from a hard metal such as stainless steel.

The outer tube 10a has a closed end including a coupling piece 11. A coupling hole 12 extends through the coupling piece 11 from one to the other side of the coupling piece 11. A sleeve 14 is rotatably mounted in the coupling hole 12 through a slide bearing 13.

Hydraulic oil is stored in the cylinder 10. A rod 15 is inserted in the cylinder 10. The rod 15 has an end portion which protrudes beyond the open end of the cylinder 10, and to which a spring seat 16 is mounted. The spring seat 16 includes a tubular skirt 16a fitted around the open end portion of the cylinder 10, and a protrusion 16b located inside of the skirt 16a. The spring seat 16 further includes a coupling piece 16c.

A coupling hole 17 extends through the coupling piece 16c from one to the other side of the coupling piece 16c. A sleeve 19 is rotatably mounted in the coupling hole 17 through a tubular slide bearing 18.

A return spring 21 is mounted between the spring seat 16 and a flange 20 on the outer periphery of the closed end portion of the outer tube 10a. The return spring 21 biases the cylinder 10 and the rod 15 in the direction in which the rod 15 protrudes from the cylinder 10.

A hydraulic damper 30 is mounted inside of the cylinder 10, and configured such that when one of the cylinder 10 and the rod 15 is pushed in the axial direction in which the rod 15 is pushed into the cylinder 10, the hydraulic damper 30 damps this pushing force.

The hydraulic damper 30 includes a plunger 31 slidably mounted in the inner tube 10b of the cylinder 10 to partition the interior of the cylinder 10 into a pressure chamber 32 and a reservoir chamber 33. The plunger 31 is formed with an insertion hole 34 into which the bottom end portion of the rod 15 is inserted, and a passage 35 through which the pressure chamber 32 and the reservoir chamber 33 communicate with each other. The hydraulic damper 30 further includes a check valve 36 provided at the passage 35 and configured to close the passage 35 when the pressure in the pressure chamber 32 exceeds the pressure in the reservoir chamber 33, and a plunger spring 37 mounted in the pressure chamber 32, and biasing the plunger 31 toward the rod 15.

A wear ring 22 formed with holes is fitted on the rod 15 so as to be slidable inside of the outer tube 10a of the cylinder 10. The wear ring 22 is prevented from axial movement by a shoulder 15a formed on the rod 15 and a snap ring 23.

Figure 2:
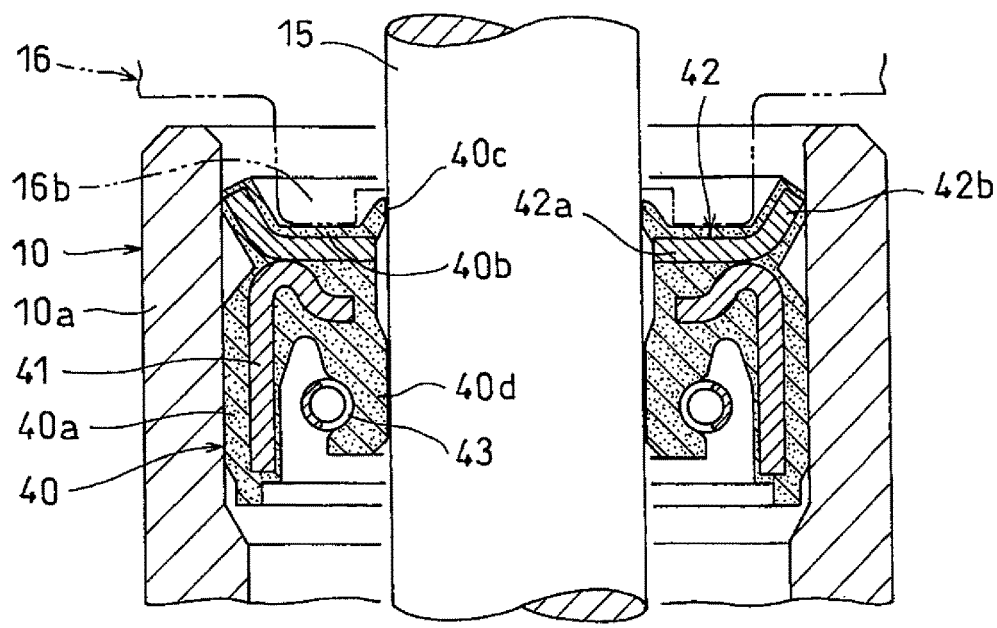
FIG. 2 is an enlarged sectional view of a portion of the hydraulic auto-tensioner where an oil seal of FIG. 1 is mounted.
Figure 3:
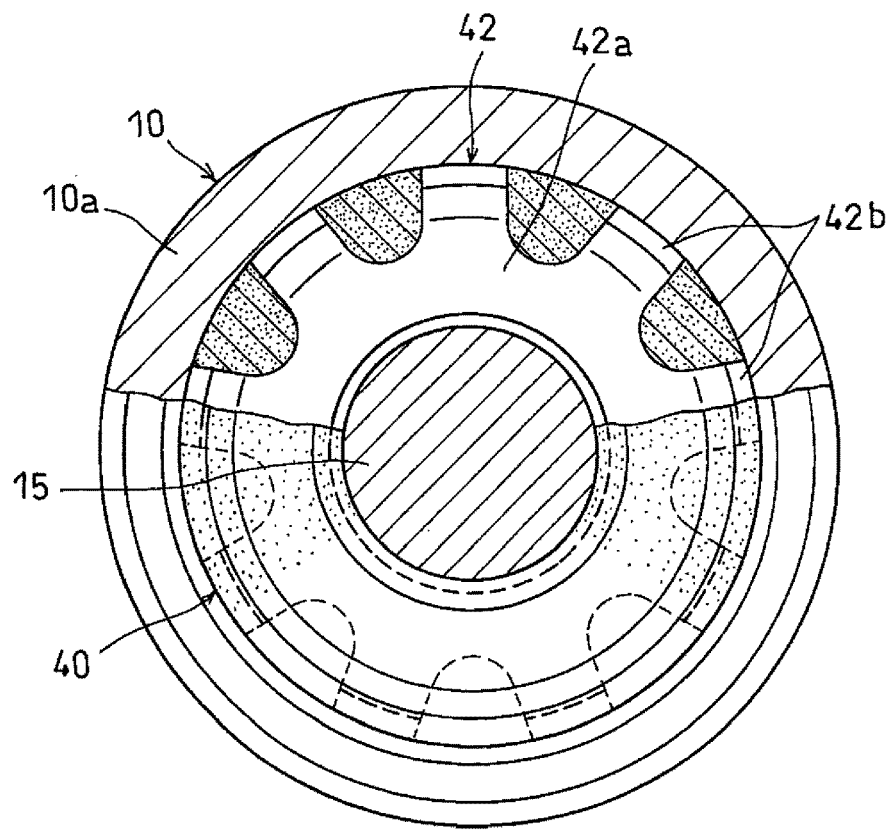
FIG. 3 is a partially cutaway plan view of FIG. 2.

As shown in FIGS. 2 and 3, an oil seal 40 is press-fitted in the cylinder 10 near the open end of the cylinder 10, and is configured to prevent leakage of hydraulic oil out of the cylinder 10.

The oil seal 40 is made from rubber, and comprises a cylindrical portion 40a having a diameter larger than the inner diameter of the end portion of the outer tube 10a, a flange 40b extending inwardly from the top end of the cylindrical portion 40a, a dust lip 40c extending obliquely upwardly and inwardly from the inner periphery of the flange 40b, and a seal lip 40d extending downwardly from the inner periphery of the flange 40b, under the dust lip 40c. The cylindrical portion 40a and the flange 40b are reinforced by a metal core 41 made from metal and embedded in and integral with the cylindrical portion 40a and the flange 40b.

The hydraulic auto-tensioner further includes a rose-shaped snap ring 42 provided over the metal core 41, and integral with the oil seal 40. The rose-shaped snap ring 42 comprises an annular plate portion 42a, and a plurality of engaging pieces 42b extending obliquely upwardly and outwardly from the outer periphery of the annular plate portion 42a while being circumferentially spaced apart from each other, and arranged such that the annular plate portion 42a is located below the dust lip 40c. The annular plate portion 42a has an inner diameter larger than the outer diameter of the rod 15.

With the cylindrical portion 40a press-fitted in the open end portion of the outer tube 10a, and the seal lip 40d pressed against the radially outer surface of the rod 15 by a garter spring 43 tightly wrapped around the seal lip 40d, the oil seal 40 is held in position due to the engagement of the engaging pieces 42b of the rose-shaped snap ring 42 with the radially inner surface of the cylindrical portion 40a.

To use this hydraulic auto-tensioner, one of the coupling piece 11 on the outer tube 10a and the coupling piece 16c on the spring seat 16 is mounted to an engine block, and the other of the coupling pieces 11 and 16c is coupled to a pulley arm pivotally supported by the engine block such that a tension pulley supported by the pulley arm is pressed against a belt under the biasing force of the return spring 21.

During use of the hydraulic auto-tensioner, when the tension of the belt changes, due to fluctuations in torque, such that the belt becomes slack, the cylinder 10 and the rod 15 move in a direction in which the rod 15 protrudes from the cylinder 10, thus eliminating slackness of the belt.

At that time, since the pressure in the pressure chamber 32 drops below the pressure in the reservoir chamber 33, the check valve 36 opens, allowing hydraulic oil in the reservoir chamber 33 to flow into the pressure chamber 32 through the passage 35. As a result, the cylinder 10 and the rod 15 smoothly moves in the direction in which the rod 15 protrudes from the cylinder 10, thus instantly eliminating slackness of the belt.

When the tension of the belt increases, the cylinder 10 and the rod 15 receive a pressing force from the belt that tends to move the cylinder 10 and the rod 15 in the direction in which the rod 15 is pushed into the cylinder 10.

At that time, since the pressure in the pressure chamber 32 exceeds the pressure in the reservoir chamber 33, the check valve 36 closes the passage 35, so that the hydraulic oil in the pressure chamber 32 damps the pressing force from the belt.

If this pressing force is larger than the elastic force of the return spring 21, hydraulic oil in the pressure chamber 32 begins to leak through the gap between the sliding surfaces of the inner tube 10b and the plunger 31 into the reservoir chamber 33, allowing the cylinder 10 and the rod 15 to move slowly in the direction in which the rod 15 is pushed into the cylinder 10, until the elastic force of the return spring 21 increases to balance with the pushing force.

To mount the oil seal 40 in position in the hydraulic auto-tensioner, with the rose-shaped snap ring 42 fitted around the rod 15, the rod 15 is inserted into the cylinder 10 until the oil seal 40 abuts the open end of the outer tube 10a and stops. Then, the spring seat 16 is further pushed down.

When the spring seat 16 is further pushed down, the rod 15 axially moves relative to the oil seal 40, so that, as shown by chain line in FIG. 2, the bottom surface of the protrusion 16b of the spring seat 16 abuts the top surface of the rose-shaped snap ring 42. When the spring seat 16 is further pushed down in this state, the oil seal 40 is pushed by the protrusion 16b, and press-fitted into the open end portion of the cylinder 10.

At that time, the engaging pieces 42b of the rose-shaped snap ring 42 are elastically deformed inwardly due to contact with the radially inner surface of the outer tube 10a, so that under the elastic restoring force of the engaging pieces 42b, the outer peripheral edges of the engaging pieces 42b engage the radially inner surface of the outer tube 10a to prevent separation of the rose-shaped snap ring 42. As a result, the oil seal 40 is securely mounted in position.

Since, as described above, by inserting the rod 15 into the cylinder 10 with the rose-shaped snap ring 42 fitted on the rod 15, and pushing in the spring seat 16, the rose-shaped snap ring 42 can be mounted in position simultaneously when the oil seal 40 is mounted in position, the hydraulic auto-tensioner can be assembled extremely easily.

Since the rose-shaped snap ring 42 is integral with the oil seal 40, and the annular plate portion 42a of the rose-shaped snap ring 42 is located below the dust lip 40c, it is possible to prevent the dust lip 40c from being pulled into a gap defined between the radially inner surface of the annular plate portion 42a and the radially outer surface of the rod 15, and torn off, when the rod 15 and the cylinder 10 move axially or incline relative to each other, during use of the hydraulic auto-tensioner.

Figure 4:
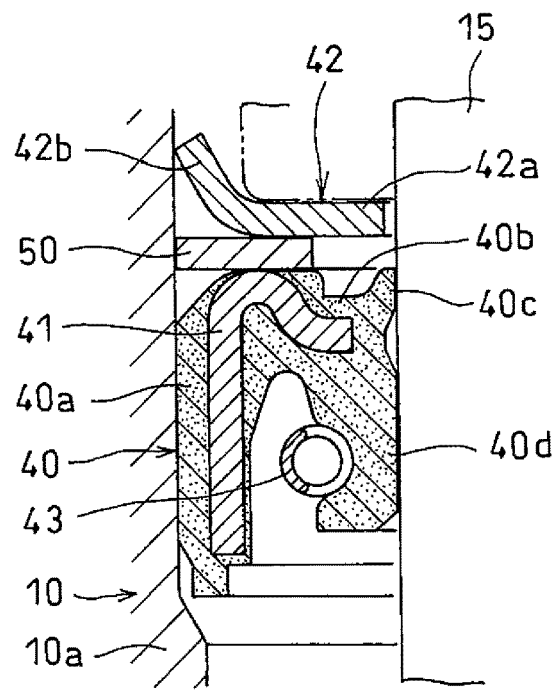
FIG. 4 is a sectional view showing a different sealing means sealing an open end of a cylinder.
Figure 5:
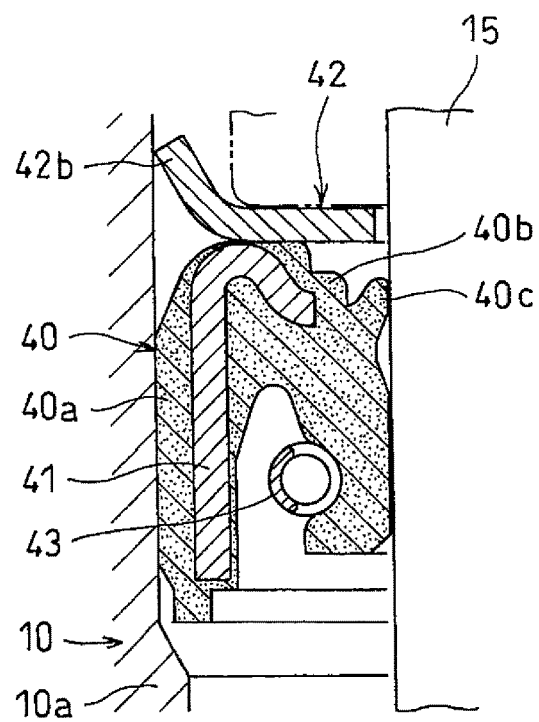
FIG. 5 is a sectional view showing still another sealing means sealing the open end of the cylinder.
Figure 6:
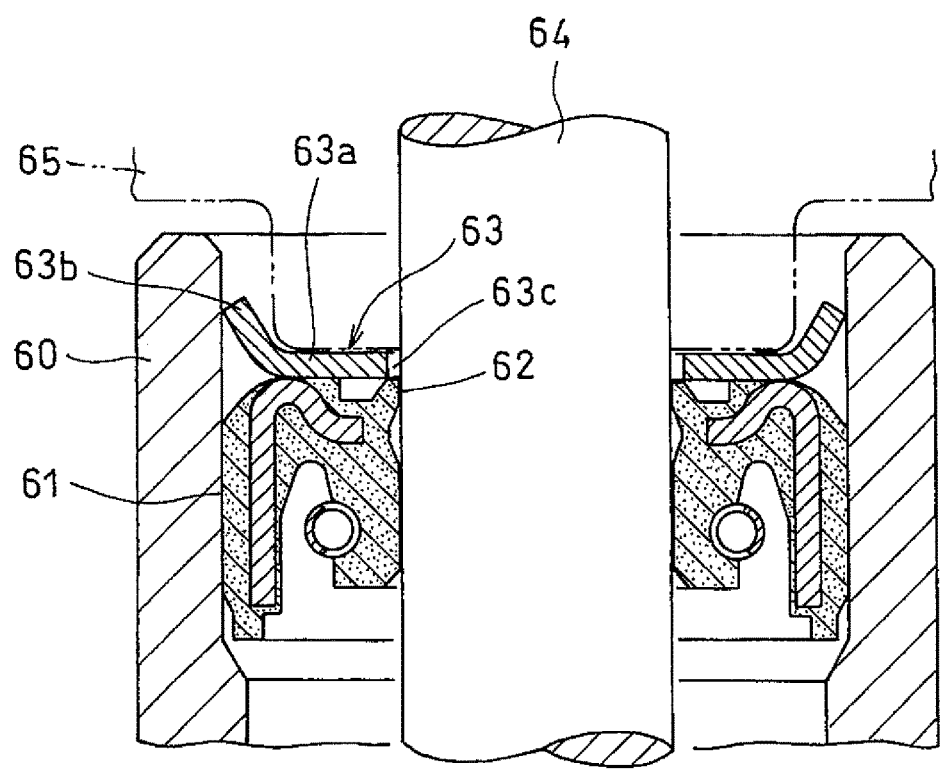
FIG. 6 is sectional view of a conventional hydraulic auto-tensioner, showing its sealing means sealing an end of a cylinder.

FIGS. 4 and 5 show embodiments in which the oil seal 40 is mounted in different manners. The embodiment of FIG. 4 differs from the embodiment of FIG. 2 in that a rose-shaped snap ring 42 which is identical in shape to the rose-shaped snap ring 42 in FIG. 2 and is separate from the oil seal 40 is press-fitted into the open end portion of the outer tube 10a after press-fitting the oil seal 40 into the open end portion of the outer tube 10a so that the rose-shaped snap ring 42 is located on top of the oil seal 40, with a spacer 50 in the form of an annular plate disposed between the opposed portions of the oil seal 40 and the rose-shaped snap ring 42, to prevent separation of the oil seal 40. Elements of this embodiment corresponding to those of FIG. 2 are denoted by identical numerals, and their description is omitted.

As shown in FIG. 4, since the spacer 50 is disposed between the opposed portions of the oil seal 40 and the rose-shaped snap ring 42, a space corresponding to the thickness of the spacer 50 is formed between the distal end of the dust lip 40c of the oil seal 40 and the rose-shaped snap ring 42. This space prevents the dust lip 40c from being pulled into the gap between the opposed portions of the rose-shaped snap ring 42 and the rod 15 when the rod 15 and the cylinder 10 axially move or incline relative to each other during use of the hydraulic auto-tensioner.

In the embodiment of FIG. 5, a rose-shaped snap ring 42 identical in shape to the rose-shaped snap ring 42 shown in FIG. 2 and separate from the oil seal 40 is used, while the oil seal 40 includes a metal core 41 which extends to a higher level than the metal core 41 of FIG. 2 so that the distal end of the dust lip 40c is located at a lower level than the top end surface of the oil seal 40. After press-fitting the oil seal 40 into the open end portion of the outer tube 10a, the rose-shaped snap ring 42 is press-fitted into the open end portion of the outer tube 10a so as to be located over the oil seal 40, thereby preventing separation of the oil seal 40.

In this embodiment, since the oil seal 40 is shaped such that the distal end of the dust lip 40c is located at a lower level than the top end surface of the oil seal 40, an axial clearance forms between the distal end of the dust lip 40c of the oil seal 40 and the rose-shaped snap ring 42. This clearance prevents the dust lip 40c from being pulled into the gap between the opposed portions of the rose-shaped snap ring 42 and the rod 15 when the rod 15 and the cylinder 10 axially move or incline relative to each other during use of the hydraulic auto-tensioner.

The oil seal 40 is made from rubber in the embodiments, but may be made from resin instead.

What is claimed is:

1. A hydraulic auto-tensioner comprising:
   a cylinder having a bottom and containing hydraulic oil;
   a rod inserted in the cylinder, the rod having an end located outside of the cylinder;
   a return spring biasing the rod and the cylinder in a direction in which the rod protrudes from the cylinder;
   a hydraulic damper mounted inside of the cylinder, the hydraulic damper being configured to damp a push-in force tending to push the rod and the cylinder in a direction in which the rod is pushed into the cylinder;
   an oil seal including a dust lip at an end of an inner periphery of the oil seal, the oil seal being mounted in a portion of the cylinder including an open end of the cylinder such that the dust lip is in elastic contact with a radially outer surface of the rod; and
   a rose-shaped snap ring including an annular plate portion, and a plurality of engaging pieces on an outer periphery of the annular plate portion, the snap-ring being mounted between the oil seal and the open end of the cylinder to prevent the oil seal from coming out of the cylinder,
   wherein an annular spacer is disposed between opposed portions of the oil seal and the rose-shaped snap ring.

2. The hydraulic auto-tensioner of claim 1, wherein the oil seal is made from a rubber or a resin.

* * * * *